United States Patent [19]

Sick et al.

[11] 3,742,225

[45] June 26, 1973

[54] READER MECHANISM FOR OPTICALLY DISCERNIBLE CHARACTERS

[75] Inventors: Erwin Sick, Jcking; Gernot Pinior, Germering; Johann Plöckl, Unterhaching, all of Germany

[73] Assignee: Zellweger AG Apparate-und Maschinenfabriken Uster, Uster, Switzerland

[22] Filed: Jan. 28, 1972

[21] Appl. No.: 221,704

[30] Foreign Application Priority Data

Mar. 22, 1971 Switzerland .......................... 4239/71

[52] U.S. Cl. .. 250/219 D, 235/61.11 E, 250/219 Q, 250/223

[51] Int. Cl. ..... G01n 21/30, G06k 7/00, G06m 7/00

[58] Field of Search ......... 250/216, 219 D, 219 CR, 250/219 Q, 219 QA, 223; 235/61.11 E; 178/7.6; 350/7, 285

[56] References Cited

UNITED STATES PATENTS

| | | | |
|---|---|---|---|
| 1,991,670 | 2/1935 | Heymer | 178/7.6 |
| 3,062,965 | 11/1962 | Sick | 350/7 X |

*Primary Examiner*—James W. Lawrence
*Assistant Examiner*—T. N. Grigsby
*Attorney*—Werner W. Kleeman

[57] ABSTRACT

A reader mechanism for optically discernible characters, especially characters associated with an article and applied thereat or thereto, wherein a transmitted beam linearly scans a reference plane and a received beam derived from a scanned character impinges upon a receiver which delivers an electrical output signal as a function of the light current of the received light beam. Two cylinder lens members are located at the region of the reference plane and extend parallel thereto and to the scanning direction. These two cylinder lens members each possessing a length sufficient for respectively operatively engaging with the transmitted light beam and the received light beam. One of the cylinder lens members is covered by a fine transmitted light beam and possesses a width which is less than that of the other cylinder lens member. This other cylinder lens member deflects light emanating from the reference plane or at a defined location before or after such reference plane to the receiver.

15 Claims, 2 Drawing Figures

READER MECHANISM FOR OPTICALLY DISCERNIBLE CHARACTERS

BACKGROUND OF THE INVENTION

The present invention relates to a new and improved reader or reading mechanism for optically discernible characters and, in particular, this development concerns a reader mechanism for optically discernible characters which are associated with an article and preferably applied thereat or thereto. The term "article" as used in the context of this disclosure is employed in its broadest sense to encompass different types of goods, wares, products or the like which can have information, preferably in coded form, applied directly or indirectly thereto.

These characters can constitute different types of information associated with the relevant articles, and as stated above, this information is preferably in coded form. In order to be able to read-out each such character an optical transmitted light beam is guided over the character and depending upon the reflection capability of the location of the character momentarily impinged or scanned by the transmitted light beam a part of such transmitted light beam will be reflected. A received light beam formed from at least part of the reflected light is delivered to an electro-optical receiver and there transformed into a suitable electrical signal. This electrical signal can be transmitted in conventional manner to a processing device, typically a computer and there evaluated. The result of this evaluation operation can relate, for instance, to the price of the article, the introduction of this article price into a calculating installation, the determination of the sale of different articles, the article numbers of which are portrayed by the coded characters, or quite generally can serve for controlling the storage or warehouse supply, or conveying any suitably desired informational data.

A particular problem with such type reader mechanism resides in the fact that the receiver, which generally consists of a photomultiplier, should receive so much light that it is possible to obtain therefrom a noisefree signal.

SUMMARY OF THE INVENTION

Accordingly, it is a primary object of the present invention to provide an improved reader mechanism for optically discernible characters by means of which a sufficient quantity of light is available at the receiver for obtaining a noisefree signal.

Another object of the present invention relates to a new and improved reader mechanism for optically discernible characters which is relatively simple in construction, economical to manufacture, and extremely reliable in operation.

Now, in order to implement these and still further objects of the present invention, which will become more readily apparent as the description proceeds, the inventive reader mechanism for optically discernible characters, especially for characters associated with an article and applied thereat or thereto, and wherein a transmitted beam of light linearly scans a reference plane and a received light beam derived from the reference plane impinges upon a receiver delivering an electrical signal which is dependent upon the light current of the receiver, is manifested by the features that two cylindrical lens members extend at the region of a reference plane parallel thereto and to the direction of scanning.

These cylindrical lens members possess a length sufficient respectively to operably engage with a transmitted beam and received beam or bundle of light rays. One of the lens members is covered or coated with a fine transmitted light beam and possesses a smaller width than the other cylindrical lens member. This other cylindrical lens member deflects light from the reference plane or light emanating a defined distance in front of or behind such reference plane to the receiver.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
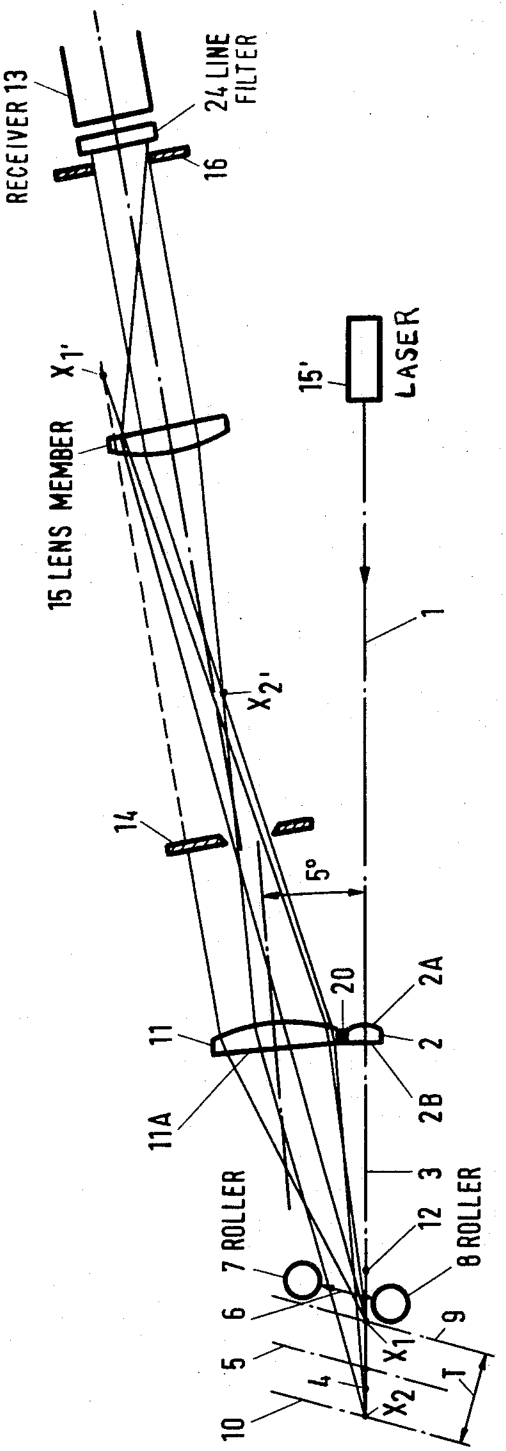
FIG. 1 schematically illustrates the essential components and the course of the bundle of light rays of a preferred constructional from of inventive reader mechanism for optically discernible characters.

Referring now to the drawing which schematically illustrates in side view the essential components and the course of the bundle of light rays of the inventive reader mechanism for optically discernible characters. Actually only enough of the reader mechanism has been described herein as same relates to the teachings of this development in order to preserve clarity in illustration. The details of the general reader mechanism arrangement constitute subject matter of our copending, commonly assigned U.S. application Ser. No. 221,702, filed Jan. 28, 1972, and entitled "Reading Apparatus for Optically Discernible Characters" to which reference may readily be made. More specifically, then, it is to be understood that a transmitted light beam 1 emanates from a suitable light source, in particular a laser such as a conventional helium gas laser schematically indicated at location 15'. The transmitted light beam 1 produces a bundle of light rays of small cross-section which is directed either approximately parallel or in slightly converging manner towards a transmitting cylinder lens member 2. The transmitted beam 1 is guided over a conventional beam deflecting mechanism, for instance as disclosed in our above-mentioned copending application, and it moves periodicially in an imaginary deflecting surface passing through the axis of the transmitted beam 1 and perpendicular to the plane of the drawing. The lengthwise axis of the transmitting cylinder lens member 2 is disposed perpendicular to the plane of the drawing. The size of the inlet or entry pupil 2A of the transmitting cylinder or cylindrical lens member 2 is chosen so as to be just sufficient for completely receiving the cross-section of the transmitted light beam 1.

The transmitting cylinder lens member 2 focuses the scanning light beam 3 emanating from the outlet surface 2B of the transmitting cylinder lens member 2 at a focal point 4.

During the scanning operation the transmitted light beam 1 is moved in a surface or plane disposed perpendicular to the plane of the drawing and through the axis of the transmitted light beam 1 owing to a pivotal movement or parallel displacement. The focal point 4 passes through a focal or image line which likewise is disposed at least in the plane of symmetry perpendicular to the plane of the drawing. The scanner constitutes subject matter of our commonly assigned, copending U.S. application, Ser. No. 221,703, filed Jan. 28, 1972, and entitled "Scanner Apparatus for Optically Discernible Characters" to which reference may be made.

Now the characters which are to be recognized by the reader mechanism are located for read-out purposes by means of such reader mechanism in a spatial tolerance range or zone having the depth of focus or definition depth T. This spatial tolerance region has associated therewith a reference plane 5 in which, in the ideal case, there is located a character to be read or such character is moved past the reader mechanism.

The reader mechanism acts through a gap or space 6 upon the character located at the aforesaid tolerance region. This gap 6 can be, for instance, disposed between two rollers 7 and 8 of a suitable conveyor mechanism. Conveyor belts or bands can be trained to travel over both of the rollers 7 and 8, these belts moving the articles over the gap or space 6 in such a manner that a scanning beam 3 arrives at the characters applied to such articles, as discussed in detail in our mentioned application. However, the gap or space 6 can also be formed merely in a plate member which forms the closest situated boundary surface 9 of the spatial tolerance range having the depth of focus T. Accordingly, at a spacing from the surface 9 corresponding to the depth of focus T there is located the furthermost situated boundary surface 10 of such spatial tolerance region.

The optical data of the system is chosen such that the transmitted beam 3 produces a light spot within the spatial tolerance region having the depth of focus T at a surface disposed parallel to the reference plane 5. This light spot possesses smaller dimensions than the structure of the character to be recognized.

Now in accordance with the small, preferably round or square cross-section of the transmitted beam 1 of, for instance, approximately 1 square millimeter, it is possible to maintain the inlet pupil or surface 2A of the transmitting cylinder lens member 2 very small, for instance to possess a size in the order of magnitude of about 3 millimeters.

A receiving cylinder lens member 11 with an inlet pupil 11A considerably larger in comparison to the transmitting cylinder lens member 2, for instance in the order of magnitude of 9 – 20 millimeters, extends substantially parallel to the transmitting cylinder lens member 2. The receiving cylinder lens member 11 can be advantageously assembled together with the transmitting cylinder lens member 2 into a structural unit in such a manner that their oppositely situated longitudinal surfaces are closely disposed. A suitable layer which is non-permeable to light, especially a light absorbing layer or coating, as generally indicated by reference character 20, preferably extends between both of these longitudinal or lengthwise extending surfaces in order to optically decouple or isolate both lens systems from one another. Depending upon the spatial arrangement of the reading mechanism with regard to the reference plane 5 and the gap 6 it can be advantageous to permit the outlet surface 2B of the transmitting cylinder lens member 2 and the inlet surface 11A of the receiving cylinder lens member 11 to extend in the same plane or to have both of these surfaces abut one another at a suitable angle, for instance amounting to 10°–30°, preferably 15°, or finally to select the spacing of both of these lens members 2 and 11 from the gap 6 so as to be different. According to an advantageous constructional embodiment of the reading mechanism of this development the focal point or image line 12 of the receiving cylinder lens 11 is located in front of the reference plane 5. The receiving cylinder lens member 11 receives a portion of the light thrown back or reflected by the character to be recognized and portrays such at the points $X_1$, and $X_2$, appearing in the drawing, depending upon whether the character which is to be recognized is located at locations $X_1$ or $X_2$ within both boundary planes 9 and 10.

The ratio of the width of the respective lens members 2 and 11 is advantageously chosen to be greater than 1:3, preferably lying in a range of approximately 1:5 to 1:15.

A receiver or receiver mechanism 13, for instance a photomultiplier, is arranged in such a manner that in the boundary cases represented in the drawing, it receives an at least approximately uniform light current. This is realized, for instance, in that at the focal plane of the receiving cylinder lens member 11 there is arranged a telecentric diaphragm 14, the lengthwise extending opening of which is directed substantially parallel to the axes of the cylinder lens members. By means of a further image-reproducing system, for instance a further cylinder lens member 15 having its axis disposed substantially parallel to both other cylinder lens members 2 and 11, the telecentric diaphragm 14 is reproduced at the receiver 13. The diaphragm has been discussed more fully in our copending U.S. application, Ser. No. 221706, filed Jan. 28, 1972, and entitled: "Reader Mechanism for Optically Discernible Characters" and is part of the subject matter thereof. Instead of using the additional cylinder lens member 15 it would be also possible to employ a hollow mirror system of known construction, by means of which light reflected at the character is delivered to the photoelectric receiver 13. A line filter 24 can be arranged in front of the receiver 13 for improving the signal-noise ratio, a further diaphragm 16 being associated with such line filter 24. Further details regarding the line filter constitute subject matter of the commonly assigned, copending U.S. application, Ser. No. 221705, filed Jan. 28, 1972, and entitled "Correction Apparatus for Optical Reading Mechanism", to which reference may be made.

As should be readily understood the favorable optical data of the receiving cylinder lens member 11 is essentially realized by the size of the gap 6, the depth T of the tolerance region and the position of both boundary planes 9 and 10. In particular, the angle of the main planes of the transmitting- and receiving cylinder lens members 2 and 11 respectively, result from the selected spatial arrangement of the system, also from the inclination of the transmitted beam 1 to the reference plane 5 and from the width and length of the gap 6.

For instance, for the purpose of preventing specular or mirror reflections at the surface of the character to be read from reaching the receiver the transmitted light beam 3 can be directed at an angle of for instance 10° – 30° with respect to a perpendicular taken with regard to the reference plane 5 and towards such reference plane. The main plane of the transmitting cylinder lens member 2 is accordingly inclined by the same angle of 10° – 30° towards the reference plane 5.

Figure 2:
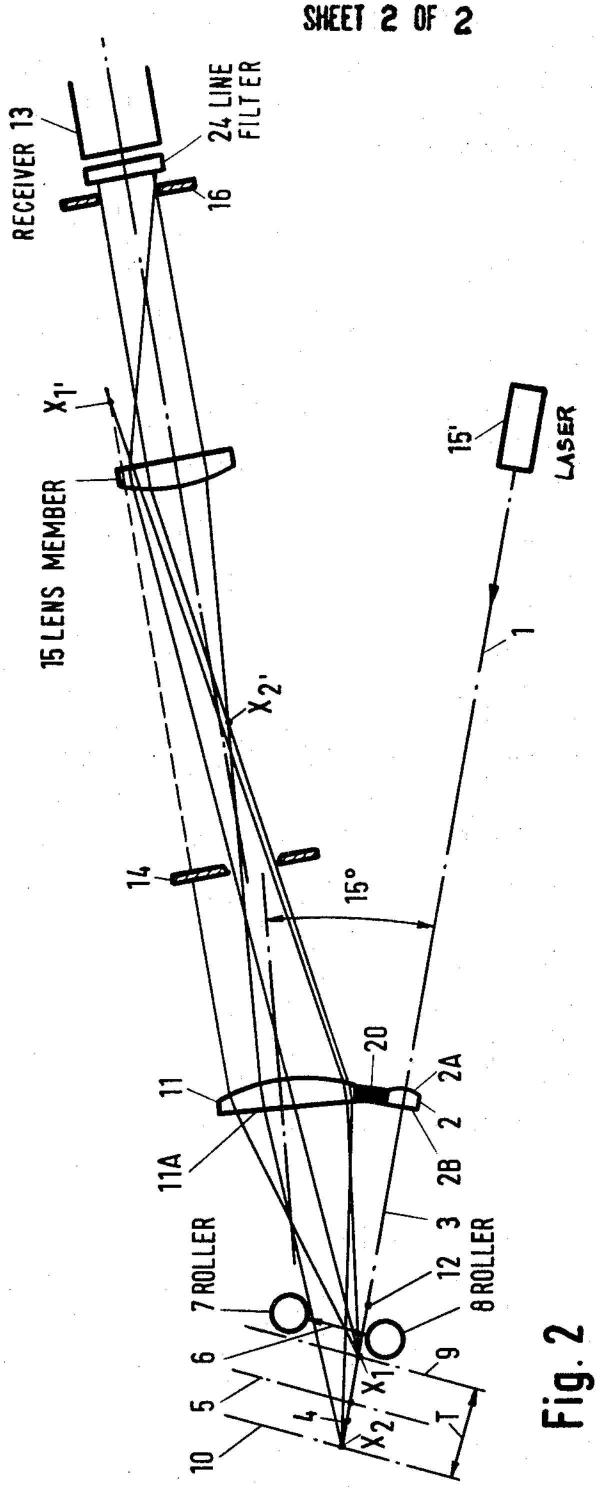
FIG. 2 illustrates a modification of the arrangement of FIG. 1.

The main plane of the receiving cylinder lens member 11 can be advantageously inclined at an angle up to for instance 15° (see FIG. 2), preferably 5° (see FIG. 1), towards the main plane of the transmitting cylinder lens member 2, in order to break away the received light beam from the transmitted light beam.

While there is shown and described present preferred embodiments of the invention, it is to be distinctly understood that the invention is not limited thereto but may be otherwise variously embodied and practiced within the scope of the following claims. Accordingly,

What is claimed is:

1. A reader mechanism for optically discernible characters, especially characters associated with an article and applied thereat or thereto, wherein a transmitted light beam linearly scans a reference plane and a received light beam derived from a scanned character falls upon a receiver which delivers an electrical output signal as a function of the light current of the received light beam, the improvement comprising two cylinder lens members located at the region of the reference plane and extending substantially parallel thereto and in the character scanning direction, each of said two cylinder lens members possessing a length sufficient for respectively acting upon the transmitted light beam and the received light beam, one of said cylinder lens members being impinged with a fine transmitted light beam and possessing a width which is less than that of the other cylinder lens member, said other cylinder lens member deflecting light emanating from the reference plane or at a defined location before or after such reference plane to the receiver.

2. The reader mechanism as defined in claim 1, wherein the ratio of the lens width of both cylinder lens members is greater than 1:3.

3. The reader mechanism as defined in claim 2, wherein the ratio of the lens width of both cylinder lens members is in a range of approximately 1:5 and 1:15.

4. The reader mechanism as defined in claim 1, wherein one of said lens members defines a transmitting cylinder lens member and the other lens member a receiving cylinder lens member, said transmitting cylinder lens member and said receiving cylinder lens member being assembled together into a structural unit at oppositely situated lengthwise extending abutting surfaces.

5. The reader mechanism as defined in claim 4, further including a layer which is non-permeable to light provided between the oppositely situated lengthwise extending surfaces of said transmitting cylinder lens member and said receiving cylinder lens member.

6. The reader mechanism as defined in claim 5, wherein said non-permeable layer comprises a light-absorbing layer.

7. The reader mechanism as defined in claim 1, wherein the focal point of the transmitting cylinder lens member is disposed centrally of the scanning movement approximately at the region of the reference plane.

8. The reader mechanism as defined in claim 1, wherein the focal point of the receiving cylinder lens member is disposed externally of a depth of focus region of the reference plane.

9. The reader mechanism as defined in claim 1, wherein selectively any one of the main plane of the transmitting cylinder lens member, the receiving cylinder lens member, or both, are inclined with respect to the reference plane.

10. The reader mechanism as defined in claim 9, wherein the angle of inclination of the main plane of the transmitting cylinder lens member with respect to the reference plane lies in a range of 10° to 30°.

11. The reader mechanism as defined in claim 10, wherein the angle of inclination of the main plane of the transmitting cylinder lens member with respect to the reference plane amounts to approximately 15°.

12. The reader mechanism as defined in claim 1, wherein the main plane of the transmitting cylinder lens member and the main plane of the receiving cylinder lens member are inclined with respect to one another in such a manner that the received light beam is broken away from the transmitted light beam.

13. The reader mechanism as defined in claim 1, wherein the angle of inclination between the main plane of the transmitting cylinder lens member and the main plane of the receiving cylinder lens member amounts to as much as 15°.

14. The reader mechanism as defined in claim 13, wherein said angle of inclination approximately amounts to 5°.

15. The reader mechanism as defined in claim 1, wherein the transmitted light beam is derived from a laser.

* * * * *